United States Patent Office 2,860,962
Patented Nov. 18, 1958

---

2,860,962
METHOD OF DEFOLIATING PLANTS

Henry Bluestone, Cleveland Heights, Ohio, assignor to Diamond Alkali Company, Cleveland, Ohio, a corporation of Delaware No Drawing. Application March 29, 1954
Serial No. 419,587

6 Claims. (Cl. 71—2.5)

---

This invention relates to improvements in plant growth regulating materials, and more particularly relates to improved compositions and to methods for their use.

In recent years there has been considerable use of chemicals to defoliate various plants, including, among others, cotton and soy bean. Defoliation of plants offers certain advantages. For example, in defoliated cotton the resultant increased exposure to sun and the drying action of air movement cause mature bolls to open faster. Moreover, defoliation prevents or reduces boll rot and, in addition, retards seed and fiber deterioration.

Cotton defoliation also has the advantage of preventing difficulties heretofore caused when the cotton leaves are crushed into the cotton, thereby leaving objectionable stains. Another difficulty heretofore encountered is the problem of removing dried leaves which are carried along to the cotton gin with the bolls.

Although the defoliation of various plants is desirable when the crop is harvested by hand, since picking becomes easier and more comfortable, defoliation is particularly advantageous when mechanical pickers or harvesters are employed. Defoliated plants are free from leaves which would otherwise clog spindles of mechanical pickers or add to the trash which must be separated from the desired plant portion being harvested. In addition, when leaves are removed, the operator of the mechanical picker has a better view of the plants to be harvested and is thus enabled to more easily position the picker over the plants.

Various chemical compounds have been heretofore suggested and used, in some instances on a rather large scale, in the defoliation of cotton and other plants. Typical of prior defoliants are calcium cyanamid, monosodium cyanamid, potassium cyanate, sodium chlorate, sodium dichromate, pentachlorophenol, sodium pentaborate, sodium monochloroacetate, and magnesium chlorate hexahydrate. While, in many instances, these defoliants have been satisfactory in leaf removal, their use has not been a complete solution to the problem of defoliation. One of the difficulties encountered generally with prior defoliants has been a general plant tissue destruction and, in many instances, the phenomenon of leaf burning with resultant leaf and plant brittleness.

Accordingly, it is the principal object of the present invention to avoid the difficulties encountered with prior defoliant compositions and to provide new and improved defoliant materials and methods for their use.

Another object of the present invention is the provision of improved defoliant compositions which are highly specific in their action as defoliants.

A further object of this invention is the provision of highly effective defoliant compositions which may be applied in a systematic manner or directly to plant foliage.

These and other objects and advantages of the invention will appear more fully from the description hereinafter.

As used herein, unless otherwise indicated, the term "plant" is intended to include all portions of the plant, such as the roots, stems, leaves, fruits, seeds, and blossoms.

The present invention contemplates a method of modifying the normal growth and life characteristics of a plant by contacting the plant with a composition comprising as an active ingredient a compound of the following formula

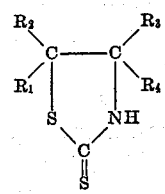

wherein $R_1$, $R_2$, $R_3$, and $R_4$ may be hydrogen or substituted and/or unsubstituted hydrocarbon radicals, including alkyl radicals, such as methyl, ethyl, propyl, butyl, and their isomers, as well as aryl, such as substituted or unsubstituted phenyl or naphthyl radicals, alkaryl, such as tolyl or xylyl radicals, and aralkyl radicals, such as benzyl, phenethyl radicals, as well as halogen substituted derivatives of the foregoing.

The compounds of this invention may also be described as substituted or unsubstituted 2-mercaptothiazolines and the two tautomers

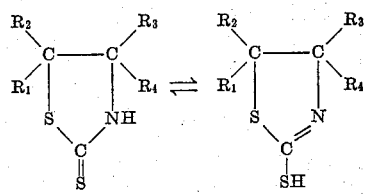

are equivalent for the purposes of this invention.

By the practice of the present invention, it has been discovered that improved defoliation is obtained when a plant is treated with a liquid composition of this invention by spraying, drenching, or immersing or with a powder composition embodying the present invention, or by applying such a composition to the soil, the defoliant action being obtained by absorption through the plant's roots and subsequent translocation through the plant circulatory system. Such latter "systemic" action is particularly advantageous in those instances where rainfall would tend to remove defoliants applied externally to the plant foliage. In any type of application, compositions embodying the present invention are singularly specific in their action as defoliants in causing abscission of the plant leaves from the stems.

In addition to the foregoing advantages as defoliants, compositions embodying this invention are also useful in the treatment of grain crops to harden them to maturity before frost, when planted late in the season. For example, such compositions are useful in hardening to maturity an alfalfa crop planted after winter wheat of the preceding year. Another application of compositions of this invention is the treatment of nursery stock to force maturity and dormancy of the stock to provide a longer growing and harvesting season.

Specific illustrative examples of the above type of compounds include:

Thiazolidine-2-thione

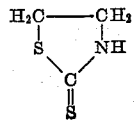

4,4-dimethyl-thiazolidine-2-thione

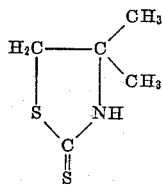

5-methyl-thiazolidine-2-thione

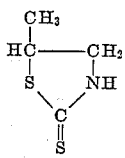

and 4-ethyl-thiazolidine-2-thione

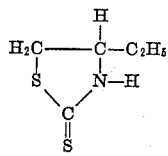

Synthesis of compounds useful in the practice of the present invention can be accomplished by reacting a 1,2-amino alcohol with carbon disulfide under suitable conditions to obtain a heterocyclic structure containing as substituents the groupings present in the amino alcohol. An alternative method of preparation comprises reacting an alkylene imine with carbon disulfide in a mutual solvent.

It will be understood, of course, in any preparation of the active compounds employed in the practice of the present invention that a pure compound is not necessarily isolated and that purification of products is generally practicable only to the extent necessary for removing by-products and impurities which otherwise would adversely affect the reaction yield or deleteriously affect the plants to which the materials are applied.

In order that those skilled in the art may better understand the practice of the present invention and in what manner it may be carried into effect, although the methods of synthesis described are not to be construed as the only suitable methods of preparation, the following examples illustrate the preparation of the compounds embodying the invention and their use as defoliants:

*Example I*

*Thiazolidine-2-thione.*—To a cooled solution of 0.5 mol of carbon disulfide in 150 ml. of methanol is added dropwise with stirring a solution of ethylenimine in 100 ml. of methanol. After the addition is complete, the mixture is cooled and the methanol is decanted and discarded. The yellow methanol insoluble residue is boiled with 200 ml. of water for about 15 minutes and an aqueous layer is decanted from the remaining yellow resin.

On cooling the decanted aqueous layer, crystals form which are removed by filtration. The residue and the said yellow resin previously obtained are combined and boiled with water to obtain a second crop of crystals; the combined crystalline yield of thiazolidine-2-thione is 28.5 grams (0.24 mol), or approximately 50% based on the weight of ethylenimine used. The melting point of the purified material is 105°–106° C.

The thiazolidine-2-thione is applied to bean plants at a dosage of 150 mg. per plant in a 4-inch diameter clay pot. The compound exhibits excellent defoliating properties, as evidenced by the removal of all of the plant leaves in four days.

*Example II*

*4,4-dimethyl-thiazolidine-2-thione.*—Into a 2-liter, 3-necked, round-bottom flask equipped with a stirring motor, thermometer, and a dropping funnel are introduced 4 mols (160 grams) of sodium hydroxide, 450 ml. of distilled water, and 0.5 gram of a surface active agent, Ultra-Wet D. S. (alkyl benzene sodium sulfonate). The flask and its contents are then cooled to a temperature of 5° C., at which time 1 mol (89 grams) of 2-amino-2-methyl-1-propanol is added slowly with stirring. Two mols (152 grams) of carbon disulfide is then added dropwise to the continuously stirred reaction mixture over a period of 3 hours, while the temperature is kept between 5° to 10° C.

After all of the carbon disulfide has been added, stirring is continued for 2 hours, while the temperature is allowed to rise slowly to room temperature. The reaction mixture is then refluxed for 8 hours at a temperature of about 45° C. and then heated for an additional 4 hours at a temperature of 90° C. to distill off excess carbon disulfide. The reaction mixture is then cooled and allowed to stand, whereupon a solid separates. The mixture is then partially neutralized with 50 ml. of concentrated hydrochloric acid and the solid product is collected by filtration. The yield of crude product amounts to 83% of theoretical. The purified product, recrystallized from isopropyl alcohol, melts at 121°–122° C.

The purified product of the foregoing reaction is applied as a spray (0.5% dispersion in water) to bean plants. The product exhibits excellent defoliating properties, as evidenced by the fact that all plant leaves are removed in four days, both the leaves and the plant being unembrittled by the defoliating material.

*Example III*

*5-methyl-thiazolidine-2-thione.*—Into a 2-liter, 3-necked, round-bottomed flask equipped with a stirring motor, thermometer, and a dropping funnel are introduced 8 mols (320 grams) of sodium hydroxide, 800 ml. of distilled water, and 1 gram of a surface active agent (Ultra-Wet D. S.). The flask and its contents are then cooled to a temperature of 5° C., at which time 2 mols (150 grams) of mono-isopropanolamine is added slowly with stirring. Four mols (304 grams) of carbon disulfide is then added dropwise to the continuously stirred reaction mixture over a period of 3 hours, while the temperature is kept between 5° to 10° C. During the addition of the carbon disulfide, the reaction mixture changes from colorless through orange to a deep red. After all of the carbon disulfide is added, stirring is continued for 2 hours, while the temperature is allowed to rise slowly to room temperature. The reaction mixture is then refluxed for 8 hours at about 45° C., then kept at 80° C. for 4 hours, and finally at 100° C. for another 4 hours, during which time the color of the reaction mixture changes from deep red through orange-red, yellow-orange to yellow. Crystals separate from the reaction mixture on standing and a second crystal crop is obtained by partially neutralizing the reaction mixture with 100 ml. of concentrated hydrochloric acid. After filtration, the yield of crude product corresponds to 83% of theoretical. The pure material, after two recrystallizations from isopropyl alcohol, has a melting point of 87.5°–88.5° C.

The pure product obtained by the foregoing process is added, at a 150 mg. dose per plant, to bean plants in 4-inch diameter pots and is effective in removing the leaves.

*Example IV*

*4-ethyl-thiazolidine-2-thione.*—1 mol of 2-amino-1-butanol, 4 mols of sodium hydroxide in 450 ml. of distilled water, and 0.5 gram of a surface active agent (Ultra-Wet D. S.) are introduced into a 1-liter, 3-necked, round-bottomed flask and the reaction is carried out in the manner described in the preceding examples, the addition of 2 mols of carbon disulfide taking place over a period of 90 minutes. The product is recrystallized from isoamyl alcohol and a yield of about 79 grams is obtained.

The product obtained in the foregoing manner is added to the soil of bean plants at a dosage of 150 mg. per plants in 4-inch diameter clay pots. Excellent defoliation is observed.

While the foregoing examples have been illustrative of the compounds of the present invention as systemic defoliants applied to the soil, it will be understood, of course, that these compounds, as well as others embodying the present invention, are also effective when applied to plants in a direct manner, as by spraying, sprinkling, or drenching the plant with a solution of the compound, or by dusting with a dry material containing a compound of the present invention as an active ingredient, or by applying a slurry containing a compound of the present invention as an active ingredient.

It will be understood, of course, that compounds embodying the present invention may be employed either alone or in mixtures containing one or more of the compounds as active ingredients, with or without small amounts of wetting agents being added.

Typical of suitable wetting agents are the following commercially available trade-name products: Igepal Co-880 (alkyl phenoxypolyoxyethylene ethanol), Arquad 2-C (quaternary ammonium compound of the formula RR'-N-(CH$_3$)$_2$Cl), Emulphor ON-870 (polyoxyethylated fatty alcohol), Tween 80 (polyoxyethylene sorbitan monooleate), Triton X-155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F-68 (condensate of ethylene oxide with an hydrophobic base formed by condensing propylene oxide with propylene glycol), Antarox A-400 (alkyl phenoxypolyoxyethylene ethanol), Triton X-120 (alkyl aryl polyether alcohol), Nacconol NRSF (alkyl aryl sulfonate), Aresol OS (isopropyl naphthylene sodium sulfonate), Span 40 (sorbitan monopalmitate), Triton B-1956 (modified phthalic glycerol alkyld resin), and Antarox B-290 (polyoxyethylated vegetable oil). At present, a preferred wetting agent is the non-ionic material Igepal CO-880, employed in an amount of about 0.1% by weight based on the amount of liquid present.

Although compounds embodying the present invention may be employed as wettable powders, with or without diluents and/or extenders or other modifying ingredients, including such things as insecticides or other plant treating agents, a typical application utilizes compounds of the present invention in the form of a liquid spray in a concentration of about 0.5% by weight. In such a spray material water is, of course, a satisfactory liquid, although other liquids also may be employed.

While there have been described various embodiments of the invention, the methods and products described are not intended to be understood as limiting the scope of the invention, as it is realized that changes therewithin are possible, it being intended to cover the invention broadly in whatever form its principle may be utilized.

What is claimed is:

1. A method of defoliating plants which comprises applying to the plants, in an amount sufficient to effect the desired defoliation, a compound having the formula

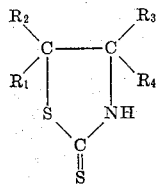

wherein R$_1$, R$_2$, R$_3$, and R$_4$ are selected from the group consisting of hydrogen alkyl, aryl, alkaryl and aralkyl radicals, wherein the alkyl radicals contain from 1 to 4 carbon atoms.

2. A method of defoliating plants which comprises applying thereto in an amount sufficient to effect the desired defoliation a composition including as an active ingredient a compound having the formula

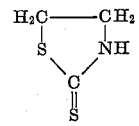

3. A method of defoliating plants which comprises applying thereto in an amount sufficient to effect the desired defoliation a composition including as an active ingredient a compound having the formula

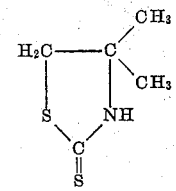

4. A method of defoliating plants which comprises applying thereto, in a defoliating amount, a material including as an active ingredient a compound having the formula

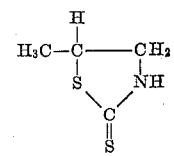

5. A method of defoliating plants which comprises applying thereto in an amount sufficient to effect defoliation a material including as an active ingredient a compound having the formula

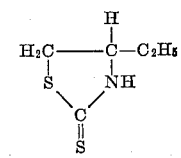

6. The method of claim 1 in which there is also employed with said compound a small amount of a wetting agent.

References Cited in the file of this patent

UNITED STATES PATENTS

| | | |
|---|---|---|
| 2,170,059 | Mathes | Aug. 22, 1939 |
| 2,251,459 | Mathes | Aug. 5, 1941 |
| 2,262,481 | Williams | Nov. 11, 1941 |
| 2,273,424 | Sturgis et al. | Feb. 17, 1942 |
| 2,282,931 | Bruson | May 12, 1942 |
| 2,288,194 | Jones et al. | June 30, 1942 |
| 2,293,465 | Jansen | Aug. 18, 1942 |
| 2,299,938 | Sturgis | Oct. 27, 1942 |
| 2,348,917 | Mathes | May 16, 1944 |
| 2,391,993 | Mathes | Jan. 1, 1946 |
| 2,525,200 | Bergmann | Oct. 10, 1950 |
| 2,693,408 | D'Amico | Nov. 2, 1954 |
| 2,776,976 | D'Amico | Jan. 8, 1957 |

OTHER REFERENCES

Ettlinger, in Journ. Am. Chem. Soc.; vol. 72, pages 4792 to 4796 incl., 1950.

Rosen, in Journ. Am. Chem. Soc.; vol. 74, pages 2994 to 2997 incl., 1952.

UNITED STATES PATENT OFFICE
CERTIFICATE OF CORRECTION

Patent No. 2,860,962                        November 18, 1958

Henry Bluestone

It is hereby certified that error appears in the printed specification of the above numbered patent requiring correction and that the said Letters Patent should read as corrected below.

Column 1, line 67, for "systematic" read -- systemic --; column 5, line 23, for "Co--880" read -- CO--880 --.

Signed and sealed this 17th day of March 1959.

(SEAL)
Attest:

KARL H. AXLINE
Attesting Officer

ROBERT C. WATSON
Commissioner of Patents